Figure 2:
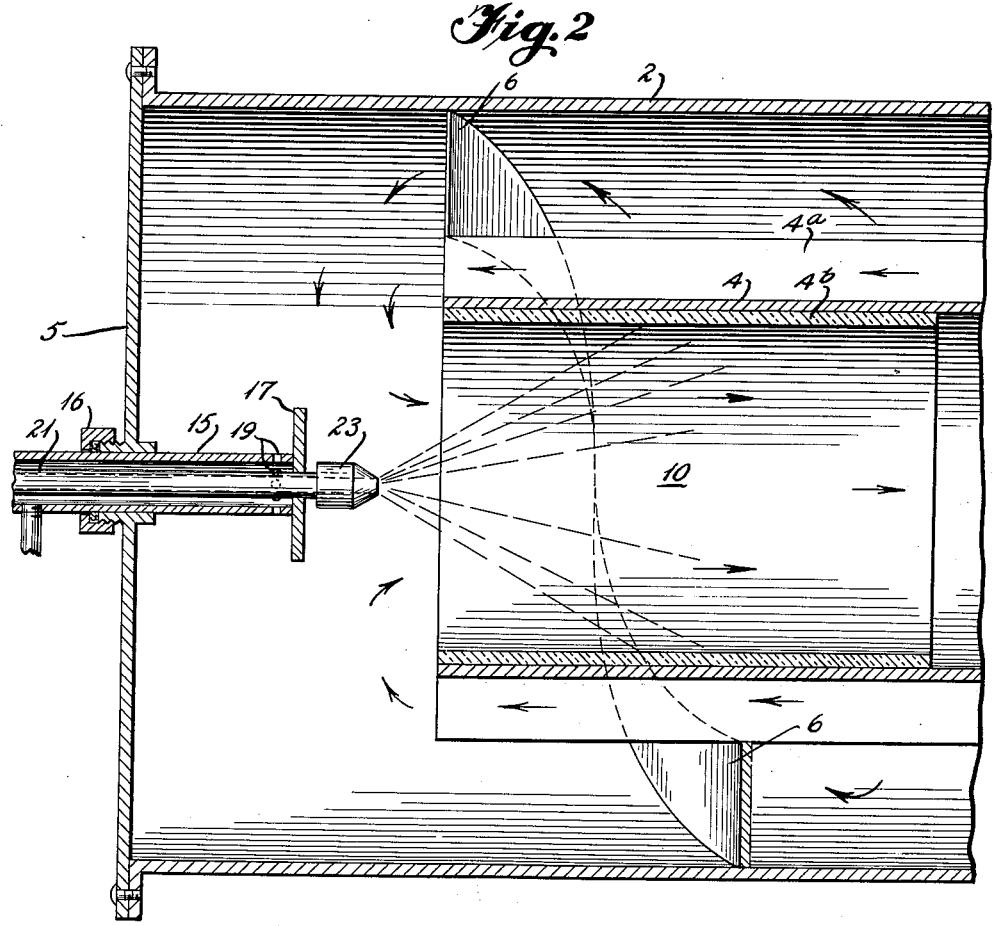

May 8, 1962  B. F. LATHAM, JR., ET AL  3,033,651
METHOD AND APPARATUS FOR MAKING CARBON BLACK
Filed Jan. 16, 1959  2 Sheets-Sheet 1
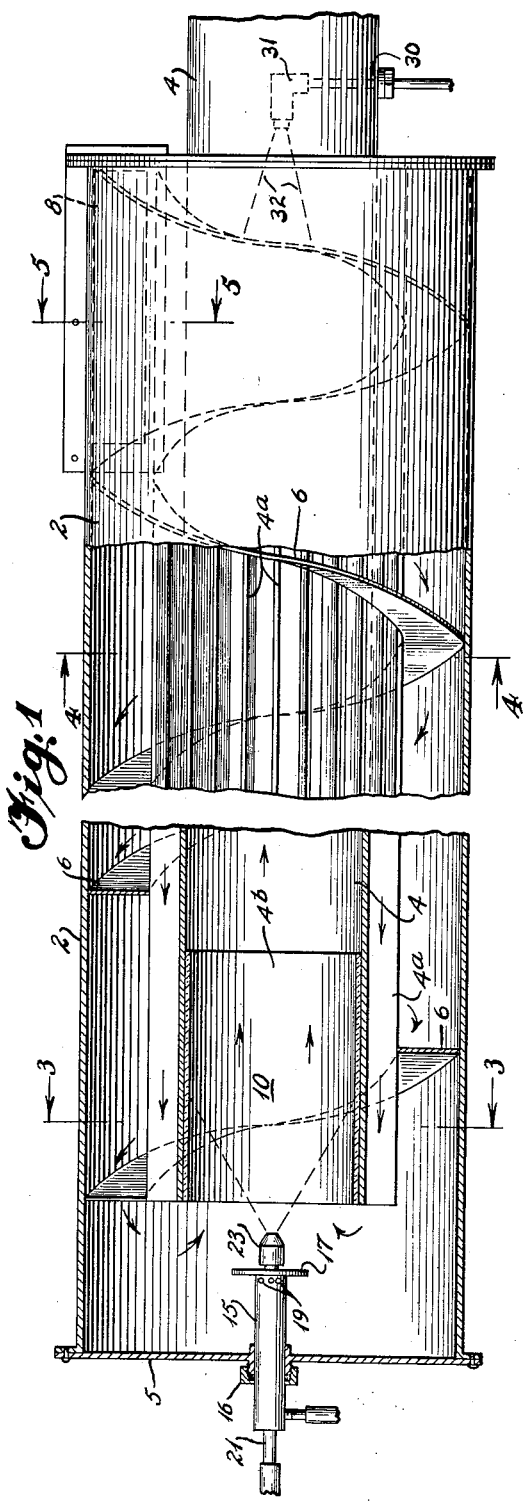
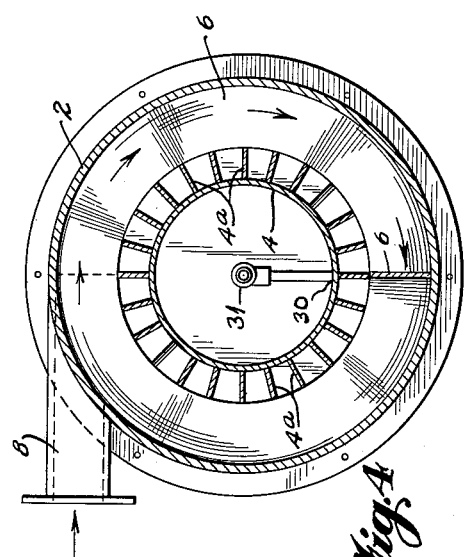
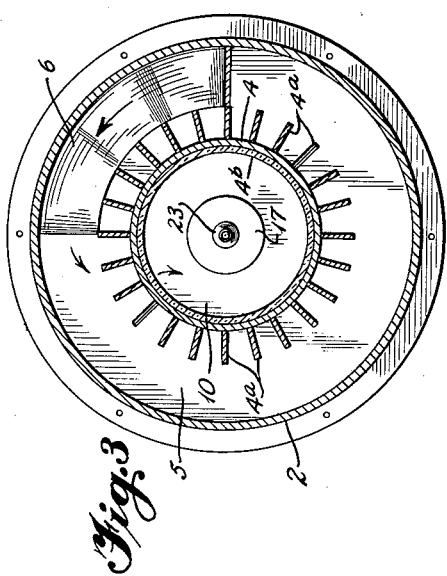
INVENTORS
Theodore A. Ruble &
Burton F. Latham, Jr.
BY Floyd Trimble
ATTORNEY May 8, 1962 B. F. LATHAM, JR., ETAL 3,033,651
METHOD AND APPARATUS FOR MAKING CARBON BLACK
Filed Jan. 16, 1959 2 Sheets-Sheet 2

INVENTORS
Theodore A. Ruble &
Burton F. Latham, Jr.

BY
Floyd Trimble
ATTORNEY

3,033,651
METHOD AND APPARATUS FOR MAKING CARBON BLACK

Burton F. Latham, Jr., and Theodore A. Ruble, Amarillo, Tex., assignors to Continental Carbon Company, Houston, Tex., a corporation of Delaware
Filed Jan. 16, 1959, Ser. No. 787,210
5 Claims. (Cl. 23—209.4)

This invention relates to the manufacture of carbon black from petroleum oils, or any type hydrocarbon, such as shale oil, coal tar, etc.

It is generally known in the art that superior grade carbon blacks are obtained by rapidly cracking a finely divided hydrocarbon at a relatively high temperature in a turbulent atmosphere where the rate of heat transfer to the hydrocarbon is very rapid. It is also well known that, when preheated air is used, a higher yield is obtained due to the fact that a smaller portion of the hydrocarbon has to be burned to heat the gases and remaining hydrocarbon up to the cracking temperature. The very high gas velocity (which, in some instances, is above the speed of sound) and the high temperatures involved (particularly in the case of reactors for producing carbon black of small particle size) tremendously reduce the period of utility of the refractory which is quite costly.

Among the objects of the present invention is the provision of a method and apparatus for making carbon black which results in materially reduced production cost without loss in quality.

Another object is to provide an apparatus for attaining the foregoing objectives which is comparatively simple and inexpensive to install, operate and maintain.

More specifically, the teachings of the present invention contemplate a cylindrical furnace, or reactor, which eliminates the usual refractory lining, and which provides the following advantages:

(1) Being made pratically entirely of metal, and involving no heavy fire brick, castable refractory walls or lining, the novel reactor is relatively light and easy to move; and its cost is much lower (for example, only 10 percent to 25 percent of the cost of refractory reactors of the same production capacity).

(2) The novel metallic reactor provides a jacket wall with the combustion air moving through the jacket (before combustion) which cools the inner wall and keeps it below its melting and scaling point. At the same time, the cooling combustion air (for later combustion) is preheated, thereby allowing higher oil feed rates and resulting in higher yields.

(3) A maximum of preheating is obtainable with a minimum of surface area because no quench is used before the heat exchange; and a maximum of temperature differential is possible. This is also assisted by countercurrent flow.

(4) The use of air cooling of the hot effluent gases greatly reduces the amount of quench water necessary which:

(a) Reduces the size requirements of the carbon black collecting system;
   (b) Reduces the size of the induced draft fan and the power requirements; and
   (c) Lowers the dew point of the effluent gases and cuts the corrosion rate of the effluent gas handling equipment.

(5) The preheated air helps to stabilize and increase the combustion and cracking rate.

The invention, then, comprises the features hereinafter fully described and as particularly pointed out in the claims, the following description and the annexed drawings setting forth in detail certain illustrative embodiments of the invention, these being indicative of but several of a number of ways in which the principles of the invention may be employed.

Figure 5:
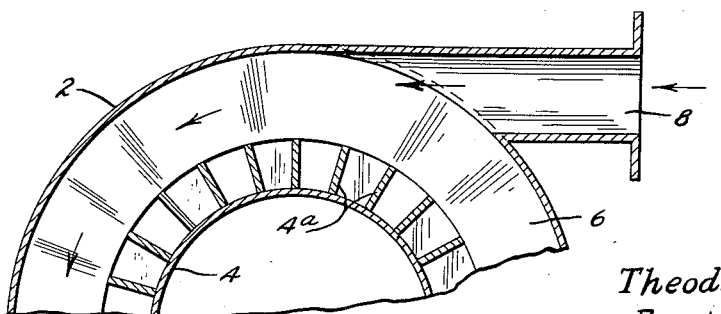

In said drawings:

FIGURE 1 is a fragmentary elevational view illustrating one form of apparatus which embodies the teachings of the present invention;

FIGURE 2 is an enlarged fragmentary elevational view, partly in section, and illustrating in better detail the burner construction which will be specifically referred to hereinafter; and FIGURES 3, 4 and 5 are sectional views taken on the lines 3—3, 4—4 and 5—5, respectively, of FIGURE 1.

Referring more particularly to the drawings, the numeral 2 designates an elongate metallic housing or shell within which there is concentrically disposed a fintube 4 which is provided on its exterior with a series of longitudinally extending relatively short radial fins 4a.

As a specific example, the outer housing or shell 2 may take the form of standard eighteen-inch (inside diameter) steel pipe with the fintube 4 being eight inches in inside diameter, and the longitudinally and radially extending fins 4a being 1¾ inches in height and constituting ninety-six (96) in number.

In FIGURE 1, the left-hand end of the fintube 4 is shown as terminating short of the adjacent end wall 5 of the outer shell 2, thereby providing an unobstructed cylindrical chamber, the purpose of which will later appear.

Disposed between the outer diametrical ends of the longitudinally and radially extending fins 4a of the fintube 4 and the inner wall of the outer shell 2 is a metallic helicoid strip 6. The inner edge of the helicoid strip 6 is welded at appropriate intervals to the outer ends of the said fins 4a, but need not be secured in any way to the inner surface of the outer shell 2.

Under some circumstances, it is desirable to provide the inlet end of the fintube 4 with a ceramic lining, as shown at 4b in FIGURES 1 and 2.

Air enters a tangential air inlet 8 at the righthand end of the helical passageway defined by the helicoid strip 6 and the space between the inner wall of the outer shell 2 and the outer diametral edges of the longitudinally and radially extending fins 4a of the fintube 4. This tangential air inlet 8 may acceptably take the form of a rectangular three-inch by twelve-inch slot.

The apparatus described specifically hereinbefore is particularly adapted to make a carbon black whose particle size is in the same range as currently produced HAF and ISAF black. As the air enters the tangential air inlet 8, a helical movement is imparted to it by the aforementioned helical passageway, the helicoid strip 6 helping to keep most of the air in helical turning motion around the axial fins 4a, while a small portion of the air passes between the fins in an axial motion. The helical motion of the air traveling over the sharp edges of the fins at high velocity causes highly turbulent flow, tending to reduce the air film thickness and increasing the heat transfer from the fins. The helicoid strip 6 also acts as a support for the fintube 4 holding it concentrically within the outer shell 2.

The combustion air, after passing the length of the helicoid passageway, turns and enters the combustion zone 10 which is inside the inlet end of the fintube 4, as shown by the arrows. It is here that the combustion gas and carbon producing oil is introduced and where combustion starts.

As illustrated in FIGURES 1 and 2, the fuel gas is supplied to the combustion zone 10 of the furnace or reactor by a pipe 15 which extends through a packing gland 16 and the center of the end wall 5 of the outer shell 2 and into the adjacent unobstructed cylindrical chamber of the latter. However, the pipe 15 terminates short of the adjacent end of the fintube 4.

A flame holder disk 17 is secured to, and carried by, the inner end of the fuel gas supply pipe 15, the latter being provided with radially extending fuel gas discharge apertures 19 which are disposed adjacent the rearward surface of said disk.

The oil supply pipe is indicated at 21 and shown as disposed axially within the fuel gas supply pipe 15; and extending through the center of the flame holder disk 17, and terminating in a spray nozzle 23 which is positioned closely adjacent the latter.

The air entering through the air inlet 8 mixes with the fuel gas which is supplied by the fuel gas pipe 15 and is discharged therefrom through the peripheral discharge apertures 19 which are located immediately behind the flame holder disk 17. The gas passes around the flame holder disk along with the air; and a uniform mixture is obtained by means of the turbulent flow. The spray nozzle 23, which is mounted on the inner end of the oil pipe 21, and immediately in front of the flame holder disk 17, atomizes the liquid hydrocarbon feedstock and introduces the fine droplets into the base of the flame at the point where the combustion starts.

The flame holder, comprising the flame holder disk 17 and its associated instrumentalities, produces a uniform mixture of fuel gas and air by passing this mixture through a restriction which, in turn, produces a high degree of turbulence and also results in a swirling higher turbulent flame upon ignition.

If vaporized hydrocarbon feedstock is used, the spray nozzle 23 may be removed and an open-end pipe substituted therefor.

In either case, the oil is cracked to carbon black and hydrogen which are carried along with the effluent gases through the wall of the fintube 4, heating the incoming combustion air and, in the process, becoming partially cooled. The exit end of the furnace or reactor is provided with one or more spray ports 30 containing a spray nozzle 31 which delivers a fine spray 32. Thus, quench water is introduced into the gas stream immediately after the effluent gas leaves the heat exchanger and is atomized into a fine spray and immediately evaporates, thereby cooling the effluent gas to a sufficiently low temperature to enable it to be handled in the following carbon collecting system which may be entirely conventional in design.

It should be noted that one of the difficulties in using a heat exchanger type reactor is caused by the relatively thick gas film on the cold side of the heat exchange wall, as compared to the hot side. It is generally known that the main resistance of heat transfer from hot gas to a cold gas through a thin solid metallic wall is not caused by the metal, but by the gas films on either side of the wall. Considering a simple, thin walled metallic tube without fins, and assuming the gas film thickness is the same on both the hot and cold side of the tube, then the metallic wall temperature would be approximately midway between the hot and cold gas temperature. In the case of the particular construction described hereinbefore, film heat transfer calculations show that the actual film on the outside of the fintube 4 is four to six times as thick as on the inside of the fintube due to the higher temperature and gas velocity therewithin. This thick film on the outside of the fintube is similar to a layer of insulation and results in metallic wall temperatures which are only between 300° to 400° F. lower than the temperature of the hot gas. Accordingly, the thick outside film is the main factor which governs the rate of heat transfer. Increasing the gas velocity on the cold side high enough to reduce the film thickness to the same as the hot side would cause prohibitive pressure drops. Thus, the use of a plain tube without fins would require a metal or alloy possessing very high temperature characteristics; and also a very long tube in order to obtain appreciable air preheating.

The use of a fintube 4, as shown in FIGURE 1, with longitudinally and radially extending fins 4a as described hereinbefore increases the outside surface area to fourteen times the inside area. This, of course, means that, due to this larger area, a very much higher rate of heat transfer may be obtained through the thicker cold gas film. The fins 4a quickly conduct the heat away from the hot wall, keeping its temperature closer to the colder air temperature. The result of using such a fintube (with fins 4a) is that much more air preheat is possible with the same length tube, together with much lower wall temperature. In such a fintube as shown in the drawings and described hereinbefore, mild or stainless steel may be utilized to contact the combustible gas without melting or excessive high temperature scaling. When the reactor shown in FIGURE 1 is handling 100,000 s.c.f.h. of combustion air and the oil and gas feed are adjusted so that the temperature in the combustion chamber 10 is from 2400° F. to 2600° F., then the air preheat should be between 800° F. and 1000° F.; and the gain in yield due to preheating will be from ten to fifteen percent.

While we have shown and described certain specific embodiments of the present invention, it will be readily understood that we do not wish to be limited exactly thereto, since various modifications may be made without departing from the scope of the invention as defined in the appended claims.

We claim:

1. In an apparatus for making carbon black, an elongate metallic tubular housing, an elongate and wholly metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate tubular housing and communicating with said air jacket, a gas burner disposed in said unobstructed chamber and in axial alignment with said elongate metallic tubular reactor, means for supplying carbon black feedstock to the flame produced by said gas burner, and a series of longitudinally and radially extending fins on the outer surface of said elongate metallic tubular reactor, the radially outermost edges of said longitudinally and radially extending fins terminating short of the inner surface of said elongate metallic tubular housing.

2. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate tubular housing and communicating with said air jacket, a gas burner disposed in said unobstructed chamber and in axial alignmnet with said elongate metallic tubular reactor, means for supplying liquid hydrocarbon to the flame produced by said gas burner, a series of longitudinally and radially extending fins on the outer surface of said elongate metallic tubular reactor, the radially outermost edges of said longitudinally and radially extending fins terminating short of the inner surface of said elongate metallic tubular housing, and a helicoid strip disposed between the radially outermost edges of said longitudinally and radially extending fins and the inner surface of said elongate metallic tubular housing.

3. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate tubular housing and communicating with said air jacket, a gas burner disposed in said unobstructed chamber and in axial alignment with said elongate metallic tubular reactor, means for supplying liquid hydrocarbon to the flame produced by said gas burner, a series of longitudinally and radially extending fins on the outer surface of said elongate metallic tubular reactor, the radially outermost edges of said longitudinally and radially extending fins terminating short of the inner surface of said elongate metallic tubular housing, and a helicoid strip disposed between and in contact with both the radially outermost edges of said longitudinally and radially extending fins and the inner surface of said elongate metallic tubular housing.

4. In an apparatus for making carbon black, an elongate metallic tubular housing, an elongate and wholly metallic tubular reactor disposed within and axially of said elongate metallic tubular housing and providing an air jacket therebetween, one end of said elongate metallic tubular housing extending beyond the corresponding end of said elongate and wholly metallic tubular reactor and providing an unobstructed chamber therein, a closure member for the aforementioned end of said elongate metallic tubular housing, an air inlet disposed adjacent the other end of said elongate tubular housing and communicating with said air jacket, a gas burner disposed in said unobstructed chamber and in axial alignment with said elongate metallic tubular reactor, means for supplying carbon black feedstock to the flame produced by said gas burner, and a series of longitudinally and radially extending fins on the outer surface of said elongate metallic tubular reactor.

5. The method of making carbon black which includes: continuously establishing a swirling, turbulent mixture of fuel gas and combustion air within a substantially unobstructed cylindrical first zone by injecting a fuel gas into preheated air in said first zone; igniting said mixture while in said first zone; passing the burning mixture into a second zone comprising an elongated metallic fintube in axial alignment and in open communication with said first zone; injecting a carbon black producing feedstock axially into said second zone and into about the base of the ignited mixture therein; pyrolytically dissociating said feedstock to produce carbon black aerosol while initially directing said combustion air into an annulus surrounding said fintube in heat exchange relationship to said aerosol and in a general countercurrent direction with respect to flow of said aerosol; and cooling the effluent and recovering the carbon black therefrom.

References Cited in the file of this patent

UNITED STATES PATENTS

| | | |
|---|---|---|
| 2,498,444 | Orr | Feb. 21, 1950 |
| 2,756,032 | Dowell | July 24, 1956 |
| 2,785,054 | Bethea et al. | Mar. 12, 1957 |
| 2,825,633 | Steele | Mar. 4, 1958 |
| 2,924,512 | Webster et al. | Feb. 9, 1960 |

FOREIGN PATENTS

| | | |
|---|---|---|
| 422,250 | Italy | June 13, 1947 |
| 1,136,025 | France | Dec. 22, 1956 |
| 547,324 | Canada | Oct. 18, 1957 |